United States Patent [19]
Cartmell

[11] 3,767,566

[45] Oct. 23, 1973

[54] CATALYTIC PETROLEUM CONVERSION PROCESS

[75] Inventor: Robert R. Cartmell, Crown Point, Ind.

[73] Assignee: Standard Oil Company, Chicago, Ill.

[22] Filed: Dec. 8, 1971

[21] Appl. No.: 206,215

Related U.S. Application Data

[62] Division of Ser. No. 5,777, Jan. 26, 1970, Pat. No. 3,661,799.

[52] U.S. Cl.................. 208/120, 208/153, 208/161, 208/164
[51] Int. Cl............................................. C10g 11/04
[58] Field of Search..................... 208/119, 120, 153, 208/161, 164; 252/417

[56] References Cited
UNITED STATES PATENTS

| | | | |
|---|---|---|---|
| 3,363,993 | 1/1968 | Campbell........................... | 252/417 |
| 3,677,715 | 7/1972 | Morrison et al................... | 23/288 S |
| 2,692,864 | 10/1954 | Gerhold.............................. | 252/417 |
| 2,428,666 | 10/1947 | Hemminger........................ | 208/153 |
| 2,862,873 | 12/1958 | Hall.................................... | 252/417 |
| 2,488,027 | 11/1949 | Page................................... | 208/153 |
| 3,353,925 | 11/1967 | Baumann et al................... | 23/288 S |

*Primary Examiner*—Delbert E. Gantz
*Assistant Examiner*—James W. Hellwege
*Attorney*—Philip Hill

[57] ABSTRACT

Catalytic conversion of petroleum feedstocks, such as the cracking of a gas oil in a vertical transport reactor, is improved by effecting rapid separation of catalyst from reactor effluent and regenerating catalyst in a multi-stage fluid-bed system. A higher yield of desirable petroleum products and a lower carbon level on spent catalyst are realized. Partial regeneration of spent catalyst is effected in a first dilute-phase regeneration stage, permitting subsequent use of a high regeneration temperature in order to reach an acceptably low carbon level on regenerated catalyst without harm to sensitive conversion catalysts.

18 Claims, 1 Drawing Figure

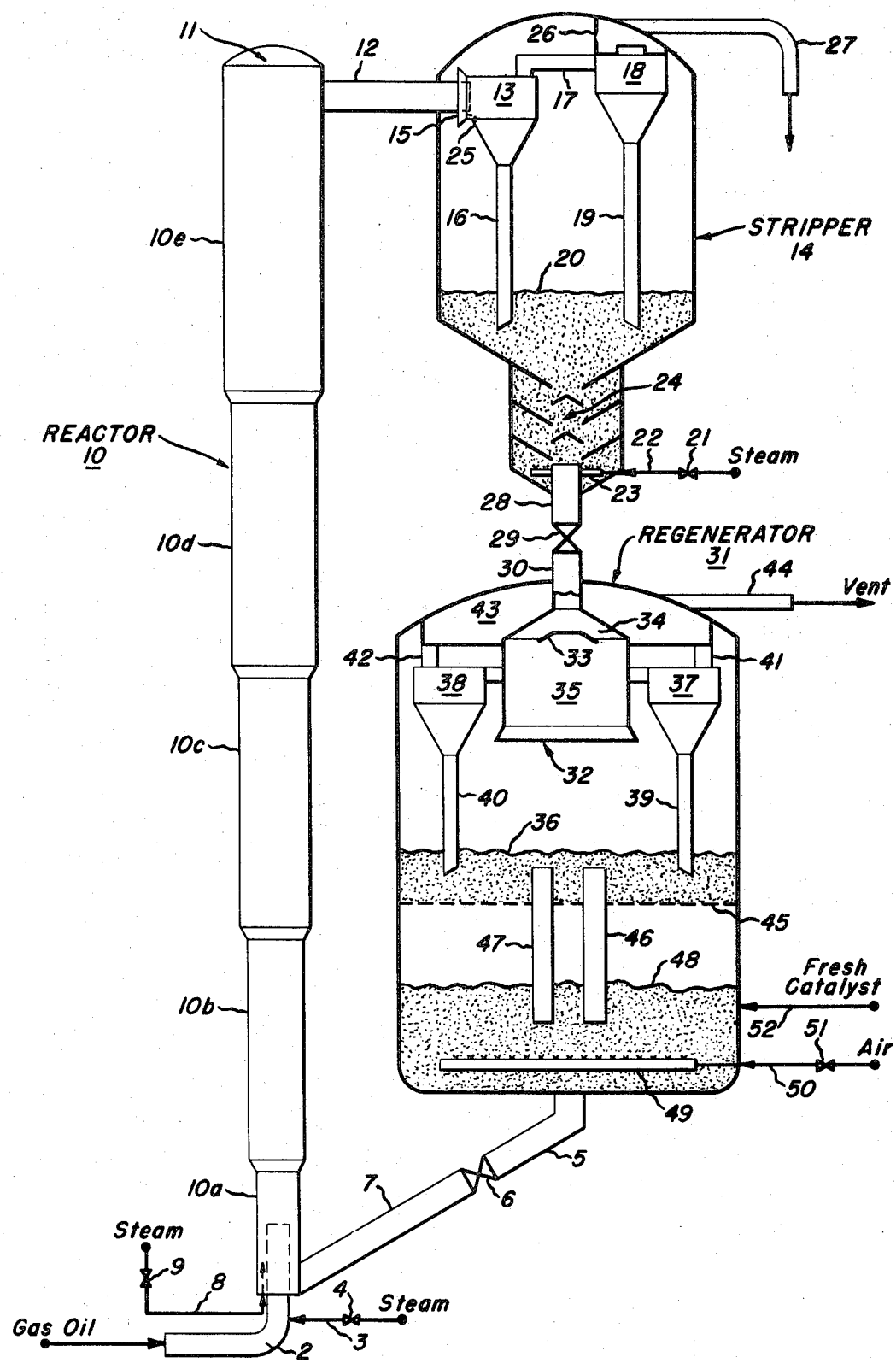

CATALYTIC PETROLEUM CONVERSION PROCESS

This application is a division of application Ser. No. 5,777, filed Jan. 26, 1970 now U.S. Pat. No. 3,661,799.

BACKGROUND OF THE INVENTION

Catalytic petroleum conversion processes employing a solid catalyst generally are operated at elevated temperatures where reaction rates become attractive. Such conversion processes usually effect rearrangements of the carbon atoms contained in the molecules comprising petroleum fractions and alter the proportion of carbon and hydrogen atoms as found in the conversion products. The tendency to form some hydrogen-poor products ultimately leads to the production of "coke", a carbon-rich non-volatile product which accumulates both on the surface and in the pores of the solid catalyst and impairs its activity. This accumulated coke must be removed from the "spent" catalyst prior to its re-use in any cyclic conversion process.

Coke is conventionally removed from solid catalysts by controlled combustion in the presence of an oxygen-containing regeneration gas. Control is effected by regulation of the combustion temperature and of the oxygen content of the regeneration gas. Catalysts for fluid-bed operations, having an alumina or silica-alumina base, are customarily regenerated at temperatures ranging from 900° to 1,100°F in contact with air which may be diluted with a suitable inert gas such as nitrogen. In addition to the rate of burning, an important variable is the $CO_2/CO$ ratio in the resulting flue gas. A high ratio severely limits the amount of coke that can be burned with a given volume of air. A low ratio promotes "afterburning" which leads to higher regeneration temperatures and destruction of catalyst activity due to localized oxidation of carbon monoxide. In a typical catalytic petroleum conversion process such as fluid-bed cracking of a gas oil over a silica-alumina catalyst a $CO_2/CO$ ratio of 0.9–1.2 in the regeneration flue gas is preferred.

Coke need not be removed completely from catalysts having an alumina or silica-alumina base but a substantial removal is required for economic re-use of the catalyst as in a cyclic conversion process. For example, reduction of the coke level to about 0.5 wt. percent adequately restores activity in a typical silica-alumina fluid-bed cracking catalyst. However, the coke level must be reduced to about 0.1 wt. percent on catalyst to restore activity adequately to a fluid-bed cracking catalyst which additionally contains a crystalline aluminosilicate, or "molecular sieve," component.

Where the coke level on the regenerated conversion catalyst is a critical factor, attention must be given to minimizing formation of coke as well as to means for effectively burning the deposited coke at a temperature where catalyst activity is not permanently impaired. Although coke formation cannot be avoided in most petroleum conversion reactions conducted over solid catalysts, secondary catalytic reactions and thermally induced conversions lead to additional coke formation and to less valuable conversion products. Accordingly, both conversion reaction conditions and catalyst regeneration conditions require careful control if the efficiency of a petroleum conversion process is to be optimized.

SUMMARY OF THE INVENTION

This invention relates to the improved catalytic conversion processing of petroleum feedstocks and to apparatus for effecting the process impovements.

More particularly, this invention relates to an improved cyclic catalytic petroleum conversion process wherein spent catalyst is quickly separated from conversion products, to minimize undesirable secondary conversion reactions and additional coke formation, permitting use of high regeneration temperature without harm to sensitive catalysts while reaching an acceptably low carbon level on the regenerated catalyst.

It is an object of this invention to minimize secondary catalytic reactions and thermal reactions which lead to increased coke production and formation of less valuable and desirable petroleum conversion products.

It is a further object of this invention to provide a regenerated catalyst having an acceptably low coke content for use in a cyclic petroleum conversion process.

It is a further object of this invention to effect catalyst regeneration under process conditions which substantially eliminate afterburning.

An additional object of this invention is to effect substantially complete regeneration of a fluid catalytic cracking catalyst containing crystalline aluminosilicate components.

A further object of this invention is to provide an arrangement of apparatus for use in a cyclic petroleum conversion process effective for minimizing secondary and thermal reactions and for burning coke deposits from catalyst surfaces under conditions which do not impair the activity of sensitive catalysts.

Still further objects will become apparent as embodiments of the invention are described.

DESCRIPTION OF THE DRAWING

The attached drawing shows the arrangement of equipment for practicing one embodiment of this invention.

A petroleum gas oil fraction together with recycle gas oil is fed by line 2 into bottom section 10a of vertical sectioned transfer-line cracking reactor 10. Dispersion steam is introduced through line 3 in an amount regulated by value 4. Regenerated catalyst is introduced through standpipe 5, slide valve 6 and standpipe 7 into reactor section 10a, together with fluidizing steam, admitted into the annular space between the walls of line 2 and reactor section 10a, through line 8 as metered by valve 9.

The fluidized mixture of catalyst and gas oil passes upwardly through successive sections 10b, 10c, 10d, 10e of transfer-line reactor 10 while catalytic cracking of the gas oil to valuble hydrocarbon fractions of greater volatility occurs. In the course of the cracking reaction coke deposits on the catalyst. The mixture of coked or spent catalyst, petroleum conversion products and unconverted gas oil is finally passed from top section 10e of the transfer-line reactor 10 into horizontal reactor exit line 12, positioned about one foot below the top of reactor 10 where a pocket of spent catalyst occupies dead space 11 to provide a cushioning effect and minimize erosion.

The fluidized effluent mixture leaves reactor section 10e by exit line 12 and enters cyclone separator 13, contained in the upper section of stripper vessel 14, through flared throat 15. Most of the spent catalyst is separated in cyclone separator 13 and discharged downwardly through dip leg 16 into fluidizing stripping bed 20. Remaining catalyst and associated vapors are discharged through exit line 17 into cyclone separator 18 where substantially all of the remaining catalyst is separated and discharged through dip leg 19 into bed 20. Inert stripping gas is introduced through valve 21 and line 22 to distributor ring 23 where the gas is passed upwardly through baffled stripping section 24 to provide a fluidized stripping bed in both zones 24 and 20. Inert stripping gas and associated stripped petroleum vapors are passed into cyclone separator 13 through annulus 25 and mixed with reactor effluent entering from line 12 in throat 15. Petroleum vapors and inert gas pass through exit line 17 and cyclone separator 18 into plenum chamber 26 and exits through line 27 for conventional separation and fractionation.

Stripped spent catalyst enters standpipe 28 and passes downwardly through slide valve 29 and standpipe 30 into regenerator vessel 31. Standpipe 30 is connected coaxially to bell-shaped member 32 at the upper extremity of member 32. Stripped catalyst flows outwardly over baffle 33 and through annulus 34 into dilute-phase fluidized regeneration zone 35 where the catalyst first contacts partially spent regeneration air rising countercurrently at a velocity sufficiently great to prevent spent catalyst from passing directly downward into dense-phase regeneration bed 36. Spent regeneration air and incipiently regenerated catalyst flow cocurrently from dilute-phase zone 35 into cyclone separators 37 and 38, mounted tangentially or radially on bell-shaped member 32. Incipiently regenerated catalyst is discharged downwardly through dip legs 39 and 40 out of contact with regeneration air into bed 36 while spent regeneration air is discharged through exit lines 41 and 42 into plenum chamber 43 and finally vented through vent line 44. Additional stages of cyclones (not shown) may be installed between lines 41 and 42 and the plenum chamber 43, each having a dip leg extending downward into bed 36.

Catalyst is further regenerated in dense-phase regeneration bed 36 fluidized with regeneration air rising through perforated grid 45 at a velocity sufficiently great to prevent catalyst falling through the perforations. Catalyst flow is directed toward the center of regenerator vessel 31 where catalyst overflows into downcomers 46 and 47 which provide means for transferring partially regenerated catalyst downwardly into fluidized dense-phase regeneration bed 48. Fluidization of bed 48 is effected by introducing heated fresh air into distributor ring 49 at the bottom of bed 48 through line 50 and metering valve 51.

Fresh make-up catalyst is added continuously through line 52 and mixed with the completely regenerated catalyst in bed 48 which leaves regenerator vessel 31 through standpipe 5 for return to the conversion cycle.

Where the catalyst contains less coke or coke burnoff is more readily effected without harm to the catalyst due to the high regeneration temperature, a suitable embodiment of this invention dispenses with one of the dense-phase fluidized regeneration zones. In this embodiment grid 45 and downcomers 46 and 47 are eliminated.

DESCRIPTION OF THE INVENTION

Provision of a regenerated catalyst, for use in a cyclic fluid-bed petroleum conversion process, having a suitably low coke content without having been subjected to conditions which permanently impair catalyst activity, is effected by a rapid separation of fluidized catalyst from petroleum conversion products followed by multistage regeneration of the stripped catalyst under controlled combustion conditions which substantially eliminate afterburning despite the high temperature employed.

Conversion of a selected petroleum fraction is effected catalytically in one or more fluidized transport reactors at conversion temperature and at a fluidizing velocity which limits the conversion time to not more than about ten seconds. Reactor effluent, comprising petroleum vapors and catalyst containing a deactivating quantity of coke, is then diverted into an exit line of smaller diameter, or cross-sectional area, than the transport reactor, where the direction of flow is substantially at a right angle to the flow in the transport reactor. Effluent velocity is maintained at least as great as transport velocity minimizing the time required for transfer to a separation zone. Reactor effluent is mixed with an inert stripping gas, such as steam, flue gas or nitrogen, and stripped petroleum vapors in the receiving throat of a cyclone separator, thus aiding in the partial desorption of petroleum components from the catalyst prior to separation. The spent catalyst is then transferred from the cyclone separator to a conventional stripper for removal of remaining petroleum components volatile at stripper temperature with the inert stripping gas.

Stripped catalyst, at stripper temperature, is admitted to a dilute-phase suspension regneration stage, or zone, where it is first contacted cocurrently with a partially spent oxygen-containing regeneration gas to initiate combustion of the coke deposits. The overall gas flow in the regenerator is countercurrent to that of the catalyst. Incipient regeneration occurs during cocurrent flow in the dilute-phase zone and the catalyst then passes to one or more dense-phase fluid-bed regeneration zones in series. Fresh oxygen-containing regeneration gas is fed into the bottom of the final catalyst regeneration zone and passed countercurrently to the catalyst. Regeneration temperature in the dense-phase fluidized-bed stages is sufficiently high to achieve substantially complete combustion of the coke deposits. Substantially complete removal of coke from catalyst is essential if activity is to be restored adequately where the catalyst comprises silica, a second refractory metal oxide and a crystalline aluminosilicate.

The regeneration temperature employed in this invention is higher than that conventionally used for coke removal. Accordingly, care must be taken to avoid excessively high localized temperatures which cause permanent deactivation of catalyst. In this invention this goal is achieved in part by use of fluidized-bed zones for regeneration to insure a uniform temperature in each zone. As oxygen-containing regeneration gas becomes spent, in its travel countercurrently to catalyst through the dense-phase stages, the concentration of carbon monoxide steadily increases. At the high regeneration temperature employed it becomes critical to avoid runaway temperatures occasioned by "afterburning", a localized phenomenon characterized by oxidation of carbon monoxide and the attendant excessive evolution of heat. This invention avoids "afterburning" by contacting the carbon monoxide-rich partially spent regeneration gas with a spent catalyst introduced at a lower temperature into the dilute-phase suspension first regeneration zone, or stage, wherein the coke on the catalyst is oxidized in preference to the carbon monoxide in the gas stream and usually at a lower temperature than is maintained in the dense-bed stages. Suitable temperature control is achieved and better utilization of oxygen is effected. Each regeneration stage is maintained separately by passing catalyst from stage to stage out of contact with the countercurrently moving regeneration gas stream.

The regenerated catalyst is then available for re-use in the transport reactor as required.

This invention may be employed with any catalytic petroleum conversion process utilizing a fluidized-bed reactor system of the transport type. Such systems require cycling of catalyst to the reactor following suitable regeneration at frequent intervals. This invention is particularly adaptable to the catalytic cracking of petroleum fractions.

Suitable petroleum fractions include light gas oils, heavy gas oils, wide-cut gas oils, vacuum gas oils, kerosenes, decanted oils, residual fractions and cycle oils derived from any of these. Such fractions may be employed singly on in any desired combination.

Suitable catalysts include those containing silica and/or alumina. Other refractory metal oxides such as magnesia or zirconia may be employed limited only by their ability to be effectively regenerated under the selected conditions. With particular regard to catalytic cracking, preferred catalysts include combinations of silica and alumina, containing 10–50 wt. percent alumina, and their admixtures with "molecular sieves" or crystalline aluminosilicates. Admixtures of clay-extended aluminas may also be employed. Such catalysts may be prepared by any suitable method such as impregnation, milling, cogelling, and the like, subject only to provision of the finished catalyst in a physical form capable of fluidization.

Suitable "molecular sieves" include both naturally-occurring and synthetic aluminosilicate materials, such as faujasite, chabazite, X-type and Y-type aluminosilicate materials, and ultrastable, large-pore crystalline aluminosilicate materials. The metal ions contained therein are exchanged in large part for ammonium or hydrogen ions by known techniques so that the sodium ion content is less than 0.5 wt. percent.

The stripping vessel is suitably maintained at a temperature in the range of from 850° to 1,050°and preferably is operated at about 950°F. Preferred stripping gas is steam although nitrogen or flue gas may be employed, introduced at a pressure, in the range from 10 to 35 p.s.i.g., suitable to effect substantially complete removal of volatile components from the spent catalyst.

The dilute-phase suspension regneration zone accomodates stripped spent catalyst, entering at a temperature in the range from 850° to 1,050°F, and partially spent regeneration gas, entering at a pressure in the range from 5 to 30 p.s.i.g. and a temperature in the range from 1100° to 1,350°F, and having a $CO_2/CO$ ratio in the range from 0.9 to 1.3. Controlled combustion of coke and heat transfer to the catalyst provide an equilibrated zone temperature which may be as much as 100°F below the temperature of the entering partially spent regeneration gas and effectively limit "afterburning." In a preferred operation spent catalyst enters at about 950°F, gas enters at about 1,250°F, and the equilibrium temperature in the zone and the temperature of the discharged spent regeneration gas is about 1,200°F. Incipiently regenerated catalyst also passes to the subsequent regeneration zone at about 1,200°F.

This dilute-phase zone is maintained within a bell-shaped vessel so constructed that the upward flow of partially spent regeneration gas from a lower zone at about 1–4 feet/second is restricted sufficiently to afford a velocity entering the dilute-phase stage in the range from 10 to 25 feet/second. A preferred velocity is at least about 15 feet/second. A baffle plate, positioned within the bell-shaped vessel, is generally desirable and may be a plate or a grid. Where the upward gas velocity is sufficiently great operation without a baffle may be practiced.

The dense-phase fluid-bed regeneration stage (or stages) is maintained at a pressure in the range from 10 to 35 p.s.i.g. and a temperature in the range from 1,100° to 1,350°F, preferably about 1,250°F. The regeneration gas may be air or any oxygen-containing gas mixture suitable for combustion of coke deposited on silica and/or alumina surfaces. The regeneration gas enters the bottom dense-bed stage from a blower or compressor. A fluidizing velocity in the range from 1 to 4 feet/second is maintained in the dense-bed regeneration stage (or stages).

Regenerated catalyst at substantially the temperature of the final regeneration stage, preferably about 1,250°F, is then provided for recycle to the transfer-line reactor. Regenerated silica-alumina catalyst contains not more than about 0.25 wt. percent coke. When a molecular sieve component is additionally present the coke level is not more than about 0.1 wt. percent.

With particular reference to effective use of this invention in conjunction with a fluid catalytic cracking process, a wide variation in cracking conditions can be tolerated. In the usual case where a gas oil feed is employed, the throughput ratio (TPR), or volume ratio of total feed to fresh feed, may vary from 1.0 to 2.0. Conversion level may vary from 40 percent to 100 percent. Conversion is here defined as the percentage reduction of hydrocarbons boiling above 430°F at atmospheric pressure by formation of lighter materials or coke. The weight ratio of catalyst to oil in the reactor may vary within the range from 2 to 10 so that the fluidized dispersion will have a density in the range from 1 to 5 pounds/cubic foot. Fluidizing velocity may be in the range from about 20 to 60 feet/second. This process is preferably effected in a vertical transport reactor wherein the ratio of length to average diameter is at least about 25.

The apparatus of this invention is generally described in the drawing. In effecting a rapid movement of transport reactor effluent into the separation zone by increasing the velocity in the horizontal exit line, the cross-sectional area of the exit line should preferably be in the range from 0.2 to 0.9 the cross-sectional area of the top zone of the transfer-line reactor. The exit line, which also serves as an inlet line to the cyclone separator, should be positioned as near the top of the transport reactor as can practically be arranged. This is usually about one foot below the top of the reactor and the dead space thus afforded fills with catalyst during the operation and so provides a cushion to minimize erosion effects.

The reactor exit line may have a circular, square or rectangular cross-section. The choice will be governed by the shape selected for the flared throat of the cyclone separator inasmuch as the exit line extends a short distance into the throat of the cyclone to create an annular space for entry of stripping gases.

Where more than one transport reactor is employed a common stripper vessel may be employed having separate cyclone separators receiving exit lines from the respective reactors. Similarly, separate standpipes return regenerated catalyst from a common regenerator to the respective transport reactors.

Where the transport reactor is taller than the combined stripper and regenerator vessels the reactor exit line will be directed downwardly forming an acute angle with the axis of the transport reactor. The exit line may also be fashioned as a conical pipe, having an axis substantially perpendicular to the axis of the reactor, and having its maximum cross-section contiguous with the reactor.

EXAMPLES

Exemplary of the practice of this invention in conjunction with a fluidized transport catalytic cracking process, the virgin gas oils characterized in Table I may be converted to naphtha and light olefins as shown in Tables II – IV. The effect is to minimize production of ethane and lighter conversion products, minimize coke formation, maximize naphtha ($C_5$–430°F) production and maximize the yield of light olefins ($C_3^=$ and $C_4^=$) for subsequent use in alkylation of light paraffinic and isoparaffinic hydrocarbons. The overall effect is to maximize total gasoline production.

TABLE I

VIRGIN GAS OIL FEEDSTOCKS, 650°–1050°F

|  | Agha Jari | El Morgan | Kuwait |
|---|---|---|---|
| Gravity, °API | 24.3 | 24.7 | 23.6 |
| Sulfur, wt. % | 1.67 | 1.74 | 2.66 |
| Nitrogen, wt. % | 0.12 | 0.13 | 0.07 |
| Ramsbottom Carbon, wt. % | 0.17 | 0.20 | 0.28 |
| Pour Point, °F | 95 | 100 | 85 |
| ASTM DISTILLATION, °F |  |  |  |
| IBP | 560 | 560 | 560 |
| 10% | 659 | 663 | 661 |
| 30% | 696 | 702 | 701 |
| 50% | 740 | 747 | 748 |
| 70% | 793 | 801 | 808 |
| 90% | 866 | 876 | 886 |
| FBP | 930 | 930 | 930 |

TABLE II

YIELDS FROM CATALYTIC CRACKING OF AGHA JARI 650°–1050°F GAS OIL

| Conversion, vol. % | 85 | 65 | 45 |
|---|---|---|---|
| Catalyst Type | Molecular Sieve | Molecular Sieve | Silica-Alumina |
| Reactor Temp., °F | 950 | 891 | 907 |
| Regenerator Temp., °F | 1241 | 1118 | 1139 |
| TPR | 1.4 | 1.2 | 1.1 |
| Yields, wt. % |  |  |  |
| $H_2S$ | 1.22 | 0.92 | 0.72 |
| $C_1$–$C_2$ & $H_2$ | 3.11 | 2.00 | 1.67 |
| $C_3$ | 1.42 | 0.66 | 0.55 |
| $C_3^=$ | 4.71 | 2.82 | 2.38 |
| $i$–$C_4$ | 2.44 | 1.58 | 0.91 |
| $n$–$C_4$ | 0.91 | 0.46 | 0.29 |
| $C_4^=$ | 5.20 | 3.53 | 3.35 |
| $C_5$–430°F | 56.58 | 48.57 | 32.54 |
| Light Cycle Oil | 11.43 | 22.81 | 21.79 |
| Heavy Cycle Oil |  | 8.16 | 28.20 |
| Decanted Oil | 4.59 | 4.20 | 3.97 |
| Coke | 8.39 | 4.29 | 3.63 |

TABLE III

YIELDS FROM CATALYTIC CRACKING OF EL MORGAN 650°″–1050°F GAS OIL

| Conversion, vol. % | 85 | 65 | 45 |
|---|---|---|---|
| Cataylst Type | Molecular Sieve | Molecular Sieve | Silica-Alumina |
| Reactor Temp., °F | 954 | 896 | 912 |
| Regenerator Temp., °F | 1250 | 1132 | 1153 |
| TPR | 1.4 | 1.2 | 1.1 |
| Yields, wt. % |  |  |  |
| $H_2S$ | 1.28 | 0.96 | 0.76 |
| $C_1$–$C_2$ & $H_2$ | 3.20 | 2.08 | 1.76 |
| $C_3$ | 1.44 | 0.67 | 0.56 |
| $C_3^=$ | 4.76 | 2.87 | 2.43 |
| $i$–$C_4$ | 2.36 | 1.52 | 0.87 |
| $n$–Chd 4 | 0.91 | 0.45 | 0.29 |
| $C_4^=$ | 5.27 | 3.61 | 3.44 |
| $C_5$–430°F | 56.15 | 48.29 | 32.16 |
| Light Cycle Oil | 11.44 | 22.58 | 21.41 |
| Heavy Cycle Oil |  | 8.42 | 28.66 |
| Decanted Oil | 4.59 | 4.20 | 3.96 |
| Coke | 8.60 | 4.35 | 3.70 |

TABLE IV

YIELDS FROM CATALYTIC CRACKING OF KUWAIT 650°–1050°F GAS OIL

| Conversion, vol. % | 85 | 65 | 45 |
|---|---|---|---|
| Catalyst Type | Molecular Sieve | Molecular Sieve | Silica-Alumina |
| Reactor Temp., °F | 944 | 892 | 908 |
| Regenerator Temp., °F | 1250 | 1127 | 1152 |
| CPR | 1.4 | 1.2 | 1.1 |
| Yields, wt. % |  |  |  |
| $H_2S$ | 2.06 | 1.56 | 1.22 |
| $C_1$–$C_2$ & $H_2$ | 2.88 | 1.86 | 1.59 |
| $C_3$ | 1.32 | 0.62 | .52 |
| $C_3^=$ | 4.72 | 2.88 | 2.45 |
| $i$–$C_4$ | 2.76 | 1.75 | 1.00 |
| $n$–$C_4$ | 0.88 | 0.44 | 0.28 |
| $C_4^=$ | 4.69 | 3.22 | 3.08 |
| $C_5$–430°F | 56.14 | 47.97 | 31.96 |
| Light Cycle Oil | 11.37 | 22.75 | 21.53 |
| Heavy Cycle Oil |  | 8.39 | 28.70 |
| Decanted Oil | 4.66 | 4.25 | 4.01 |
| Coke | 8.52 | 4.31 | 3.66 |

Illustrative of a preferred practice of this invention, Mid-Continent gas oil (23.4°API) in the amount of 33,600B/D, comprising 21,000 B/D virgin gas oil and 12,600 B/D recycle gas oil (TPR = 1.6) is charged at 680°F together with dispersion steam to a vertical sectioned transport cracking unit. Regenerated silica-alumina catalyst containing molecular sieve is charged at 1250°F to the unit at the rate of about 15–20 tons/minute. The fluidized dispersion of catalyst and oil at about 1000°F is passed upwardly through the reactor initially at a velocity of 22 feet/second. Initial dispersion density is 4.9 pounds/cubic foot. Reactor pressure in the bottom section is 23.5 p.s.i.g. Suceeding sections of the vertical reactor increase in diameter, the top section having a diameter of 64 inches in contrast to the 44-inch diameter of the bottom section. The dispersion density in the top section is 3.0 pounds/cubic foot. The velocity at the outlet from the top section approximates 22 feet/second although variation in velocity does occur during the 7-second reaction time as the dispersion moves up through the suceeding sections of the transfer-line reactor.

The fluidized dispersion of spent catalyst, oil, steam and conversion products at 950°F is passed through a horizontal, rectangular duct (31 × 35 inches) at a velocity of about 70 feet/second into a cyclone separator having a flared throat fashioned to receive the duct. The cyclone is contained within a stripper vessel and stripping steam together with stripped hydrocarbons ente the cyclone separator through the flared throat, there being an open space between the duct and the internal dimension of the flared throat. The bulk of the catalyst is quickly separated and passed into a dip leg. All volatile material and a minor amount of catalyst are ultimately separated in a second cyclone and all of the spent catalyst is passed to the stripping zone by means of dip legs where it is stripped countercurrently with steam at 950°F and about 22 p.s.i.g.

The stripped catalyst, containing about 1.0 wt. percent coke, is passed through a slide valve to a bell-shaped dilute-phase regeneration zone, first flowing over an inverted conical baffle to force the catalyst to the periphery of the bell-shaped hood. Here the catalyst is contacted cocurrently with partially spent regeneration air at about 22 p.s.i.g. The catalyst enters this first regeneration zone at about 950°F and the upflowing air stream is at a temperature of about 1250°F. A gas velocity of about 15 feet/second forces the catalyst into cyclone separators mounted tangentially on the hood to improve distribution. Partially regenerated catalyst and spent regeneration air leave the zone at about 1200°F.

The catalyst is then fed through dip legs into the upper of two dense-phase beds. The dip legs direct the catalyst to the outer portion of the upper bed while centrally located downcomers eventually transfer the catalyst to the lower bed. The dense-phase zones operate at about 1250°F and 25 p.s.i.g. Preheated air is fed into the bottom of the lower bed and moves upwardly through a perforated-plate grid into the upper bed. Air bubbles tend to enlarge as they pass upward through the lower bed and are re-dispersed as they pass through the perforated-plate grid. A fluidizing velocity of about 2.5 feet/second prevents catalyst from falling through the holes in the grid where the localized velocity is about 100 feet/second.

The regenerated catalyst has a carbon content in the range 0.01–0.05 wt. percent and effects about 85 percent conversion of gas oil under the described conditions.

The scope of this invention is not to be construed as limited by the process arrangement shown in the drawing or by the particular embodiments described herein.

I claim:

1. In a process for the catalytic conversion of a petroleum feedstock in a fluidized reaction zone, wherein the spent conversion catalyst is separated from reactor effluent, stripped of volatile petroleum components, regenerated by combustion of carbonaceous deposits and recycled to the reaction zone, the improvement comprising the steps of:
   a. passing the spent catalyst from the reaction zone directly into a cyclone separator, contained within an upper section of a stripper vessel, by means of a substantially horizontal exit line, the cyclone separator having a flared receiving throat of greater cross-sectional area than the exit line and fashioned to receive the exit line;
   b. mixing the spent catalyst with an inert stripping gas and associated stripped petroleum vapors in the cyclone separator, the stripping gas and vapors entering the cyclone separator through the annular space afforded between the receiving throat and the exit line, disengaging and stripping the spent catalyst;
   c. contacting the stripped spent catalyst with a partially depleted oxygen-containing gas in a dilute-phase first regeneration stage, to effect partial regeneration of the catalyst; and
   d. contacting the partially regenerated catalyst with a fresh oxygen-containing regeneration gas in a separate fluidized dense-phase second regeneration stage to effect substantially complete regeneration of the conversion catalyst.

2. The process of claim 1 wherein the inert stripping gas comprises steam.

3. The process of claim 1 wherein the oxygen-containing regeneration gas comprises air.

4. The process of claim 1 wherein the petroleum feedstock is converted in the presence of a conversion catalyst comprising silica and a refractory inorganic oxide selected from the class consisting of alumina, magnesia and zirconia.

5. The process of claim 1 wherein the petroleum feedstock is converted in the presence of a conversion catalyst comprising silica and alumina.

6. The process of claim 5 wherein the regenerated conversion catalyst contains 0.01 to 0.25 weight percent carbon.

7. The process of claim 5 wherein the conversion catalyst additionally comprises a crystalline aluminosilicate.

8. The process of claim 7 wherein the regenerated conversion catalyst contains less than 0.1 weight percent carbon.

9. A process for the catalytic cracking of a petroleum gas oil in a vertical elongated transport reactor in the presence of a fluidizable, regenerable catalyst comprising silica and a refractory inorganic oxide selected from the class consisting of alumina, magnesia and zirconia, which process comprises the steps of:
   a. introducing the gas oil together with recycle gas oil and dispersion steam into a bottom section of the transfer-line reactor;
   b. introducing the catalyst, from a first standpipe and fluidizing steam into the bottom section of the transport reactor;
   c. passing a mixture of catalyst and gas oil in fluidized dispersion upwardly through a series of sections having successively greater cross-sectional areas under conditions suitable to effect about 45 to 95 percent conversion of gas oil;
   d. discharging the reaction mixture from a top section of the transport reactor, through an exit line disposed substantially horizontally, directly into a cyclone separator, contained within a stripping vessel and having a dip leg extending below the surface of a dense-phase, baffled, fluidized-bed stripping zone;
   e. discharging stripping steam and vaporized stripped reaction components from the stripping zone into the cyclone separator concomitantly with the reaction mixture;
   f. separating spent catalyst from vaporized components and passing the catalyst downward through the dip leg into the stripping zone and stripping with steam;
   g. passing stripped spent catalyst downward through a second standpipe into a regenerator vessel, comprising an upper dilute-phase stage and at least one lower dense-phase stage;
   h. regenerating the catalyst as it is moved in downward flow countercurrent to an oxygen-containing regeneration gas stream, the gas stream entering at the bottom of the lowermost dense-phase stage in the regenerator vessel;

i. flowing regenerated catalyst downward into the first standpipe;

j. fractionating the separated vaporized components into valuable cracked petroleum fractions and a recycle gas oil; and k. introducing the regenerated catalyst, and recycle gas oil, together with additional petroleum gas oil, into the bottom section of the vertical transfer-line reactor.

10. The process of claim 9 wherein the catalyst additionally comprises a crystalline aluminosilicate component.

11. The process of claim 9 wherein the ratio of length to average diameter of the vertical transfer line is at least 25, the bottom section mixing temperature is about 1000°F and the top section exit line temperature is about 950°F, the fluidized dispersion has a density of 1 to 5 pounds per cubic foot, and the upward velocity of the fluidized dispersion is in the range from about 20 to about 60 feet per second.

12. The process of claim 9 wherein the exit line is positioned substantially horizontally at a distance of about one foot downward from a top blind closure on the top vertical reactor section, providing an area containing a cushioning plug of spent catalyst.

13. The process of claim 9 wherein stripped catalyst, at a temperature of about 950°F, is introduced into and maintained in a dilute-phase fluidized stage, being the uppermost regeneration stage, with a partially depleted oxygen-containing regeneration gas, the regeneration gas entering the stage at a temperature of about 1250°F and having an upward velocity of about 15 feet per second.

14. The process of claim 9 wherein the ratio of recycle gas oil to fresh gas oil feed is in the range from 0.0 to 1.0 and the weight ratio of catalyst to oil in the reactor is in the range from about 2 to about 10.

15. The process of claim 9 wherein the exit line of the reactor has a cross-sectional area no greater than about two-thirds the cross-sectional area of the top section of the transfer-line reactor.

16. A process for the rapid separation of spent catalyst from petroleum vapors in the effluent of an elongated fluid-bed catalytic petroleum conversion reactor, comprising the steps of:

a. passing reactor effluent into a reactor exit line, having an axis substantially perpendicular to the axis of the reactor and a cross-sectional area less than the cross-sectioned area of the reactor;

b. transferring reactor effluent from the reactor exit line into a cyclone separator, contained within a stripper vessel and having a flared receiving throat and a dip-leg, the receiving throat having a cross-sectional area greater than the cross-sectional area of the exit line and adapted to receive the exit line;

c. passing an inert stripping gas and associated stripped petroleum vapors into the cyclone separator through an annular opening described by the receiving throat and the exit line;

d. disengaging the spent catalyst; and e. discharging the spent catalyst downwardly through the dip-leg.

17. The process of claim 16 wherein the inert stripping gas comprises steam.

18. The process of claim 16 wherein the axis of the elongated conversion reactor lies in a vertical plane and the reactor exit line is disposed substantially horizontally from the reactor.

* * * * *